(12) United States Patent
Bae

(10) Patent No.: US 11,999,015 B2
(45) Date of Patent: Jun. 4, 2024

(54) SYSTEM AND METHOD FOR CUTTING FILM

(71) Applicant: NPS CO., LTD., Cheongju-si (KR)

(72) Inventor: Seong Ho Bae, Daejeon (KR)

(73) Assignee: NPS CO., LTD., Cheongju-si (KR)

( * ) Notice: Subject to any disclaimer, the term of this patent is extended or adjusted under 35 U.S.C. 154(b) by 744 days.

(21) Appl. No.: 17/099,073

(22) Filed: Nov. 16, 2020

(65) Prior Publication Data

US 2022/0152743 A1 May 19, 2022

(51) Int. Cl.
*B23K 26/38* (2014.01)
*B23K 26/08* (2014.01)
(Continued)

(52) U.S. Cl.
CPC .......... *B23K 26/38* (2013.01); *B23K 26/0846* (2013.01); *B23K 26/0869* (2013.01); *B23K 26/402* (2013.01); *G02B 5/3025* (2013.01)

(58) Field of Classification Search
CPC ............... B23K 26/38; B23K 26/0846; B23K 26/0869; B23K 26/0876; B23K 26/0892
See application file for complete search history.

(56) References Cited

U.S. PATENT DOCUMENTS

2011/0203430 A1* 8/2011 Nakai .................... B65H 35/00
83/175
2019/0375666 A1* 12/2019 Mori .................... C03B 33/091

FOREIGN PATENT DOCUMENTS

KR  10-2011-0136163 A   12/2011
KR     101346647 B1 *  1/2014
(Continued)

*Primary Examiner* — Timothy Kennedy
(74) *Attorney, Agent, or Firm* — Bridgeway IP Law Group, PLLC; Jihun Kim

(57) ABSTRACT

Disclosed herein is a film cutting system for dividing and forming a film sheet having a predetermined unit width and unit length from a raw film by laser cutting of the raw film. The film cutting system includes: a supply unit configured to intermittently supply the raw film by a predetermined unit supply length in a length direction of the raw film; a first laser unit including first and second laser nozzles each configured to radiate a laser beam onto the raw film, and a first head driver configured to convey the first laser nozzle and the second laser nozzle in a width direction of the raw film perpendicular to the length direction in a reciprocating manner; and a second laser unit including a laser nozzle disposed spaced apart from the first laser unit by the unit length in the length direction and configured to radiate a laser beam onto the raw film, and a second head driver configured to convey the laser nozzle in the width direction in a reciprocating manner, wherein, when the raw film is supplied by the supply unit, the first head driver dispose the first laser nozzle and the second laser nozzle so as to be spaced apart from each other by the unit width, and each of the first laser nozzle and the second laser nozzle radiates, in the length direction, the laser beam onto the raw film supplied by the supply unit to slit the raw film, and wherein, when the slitting of the raw film is completed, the supply unit stops supplying the raw film; the first head driver conveys one of the first laser nozzle and the second laser nozzle in the width direction; the second head driver conveys the laser nozzle in the width direction; and the one of the first laser nozzle and the second laser nozzle and the laser nozzle respectively radiate the laser beam onto the raw film in the width direction to cut the raw film to divide and form the film sheet from the raw film.

11 Claims, 21 Drawing Sheets

(51) Int. Cl.
  *B23K 26/402* (2014.01)
  *G02B 5/30* (2006.01)

(56) References Cited

FOREIGN PATENT DOCUMENTS

| KR | 10-1628326 B1 | 6/2016 |
| KR | 101628326 B1 * | 6/2016 |
| KR | 10-2016-0125776 A | 11/2016 |

* cited by examiner

[FIG. 1]
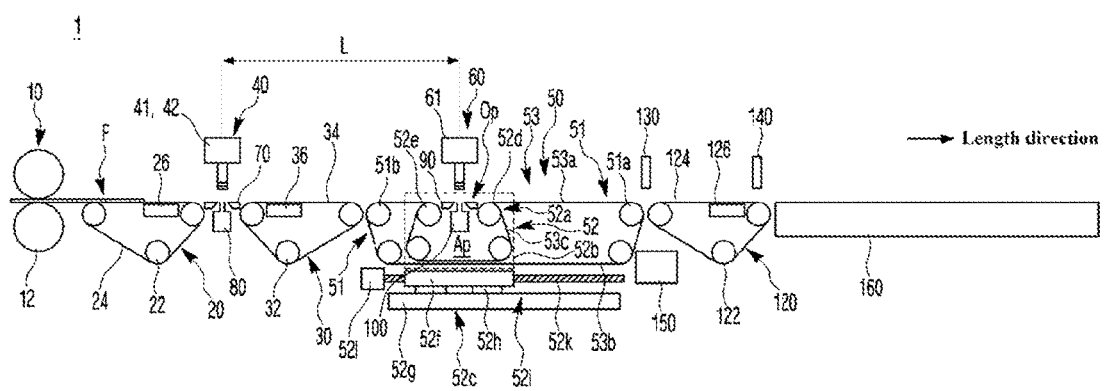

[FIG. 2]
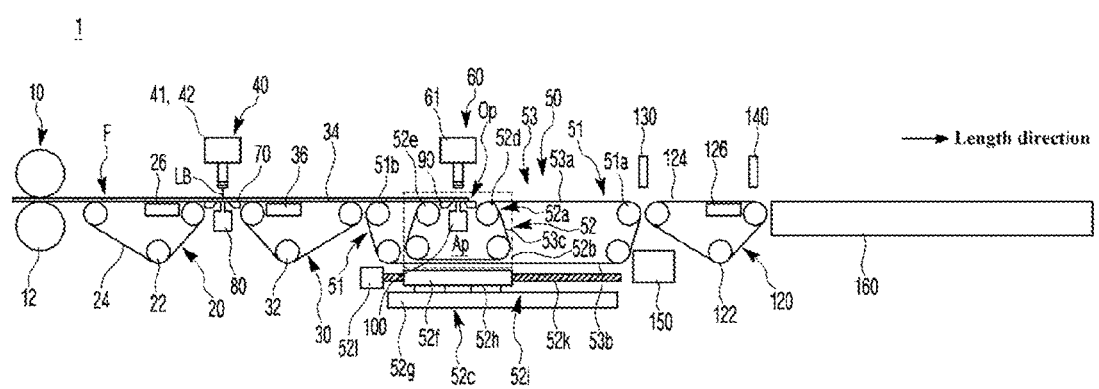

[FIG. 3]
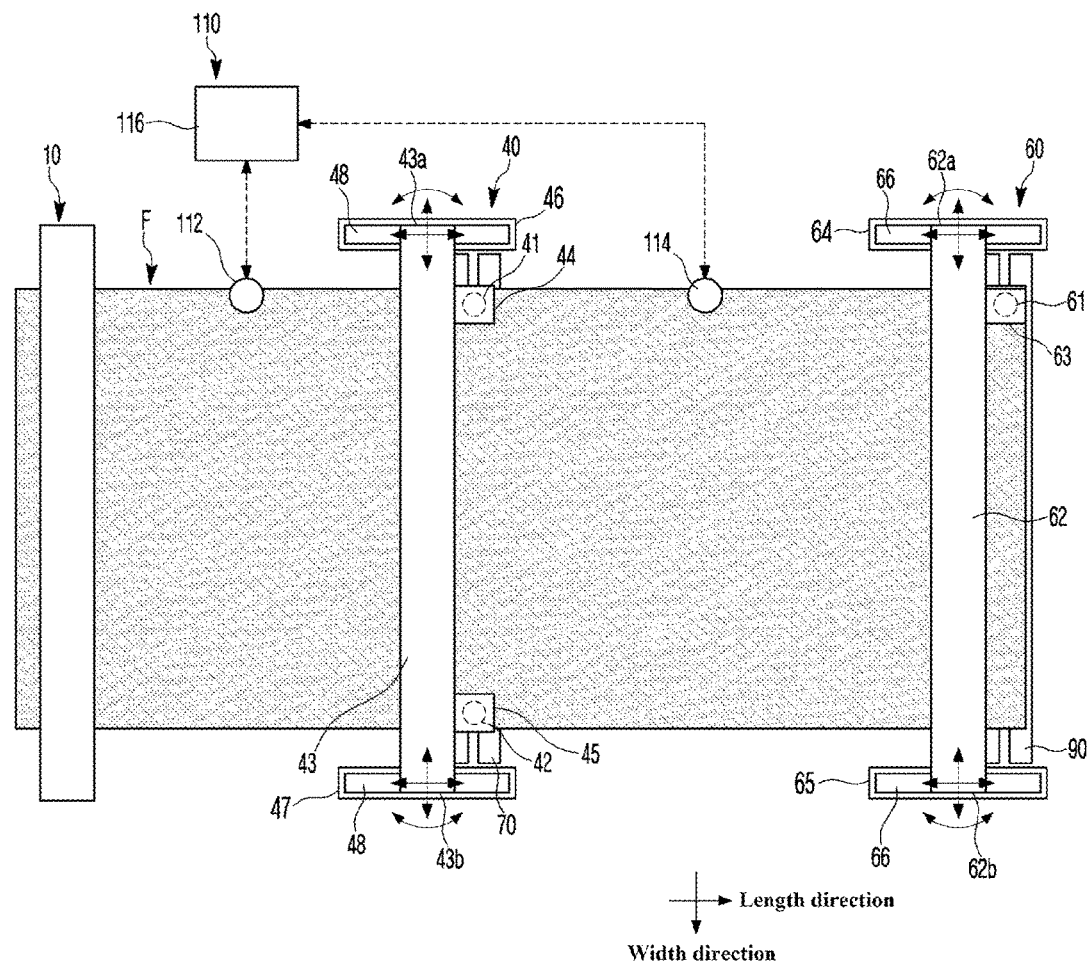

[FIG. 4]
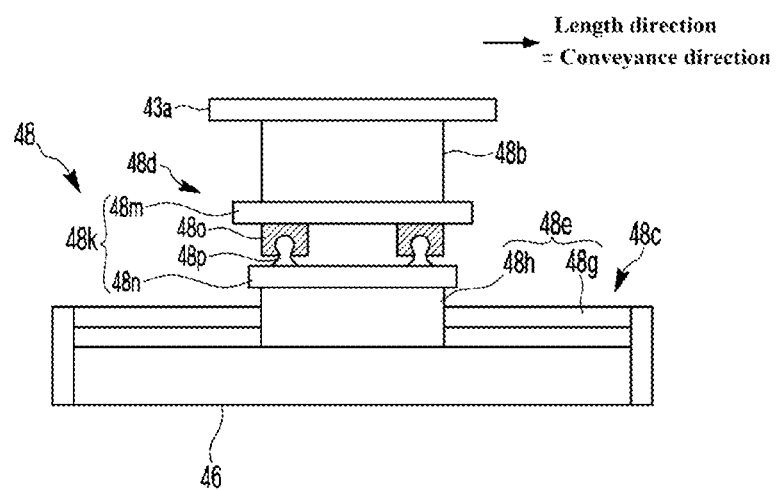

[FIG. 5]
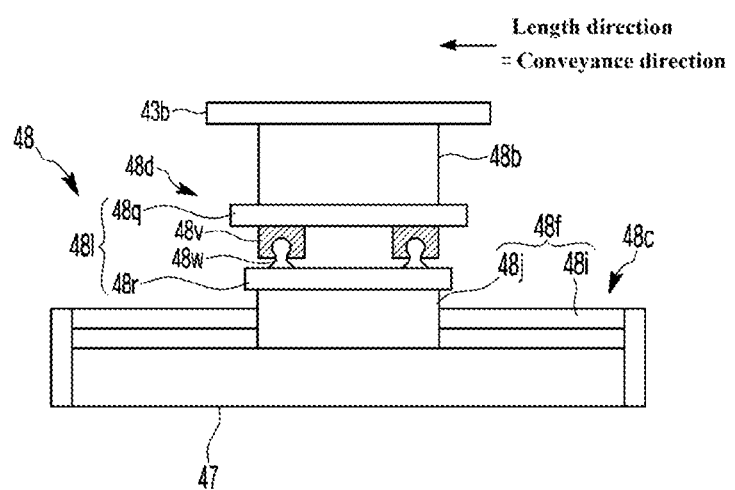

[FIG. 6]
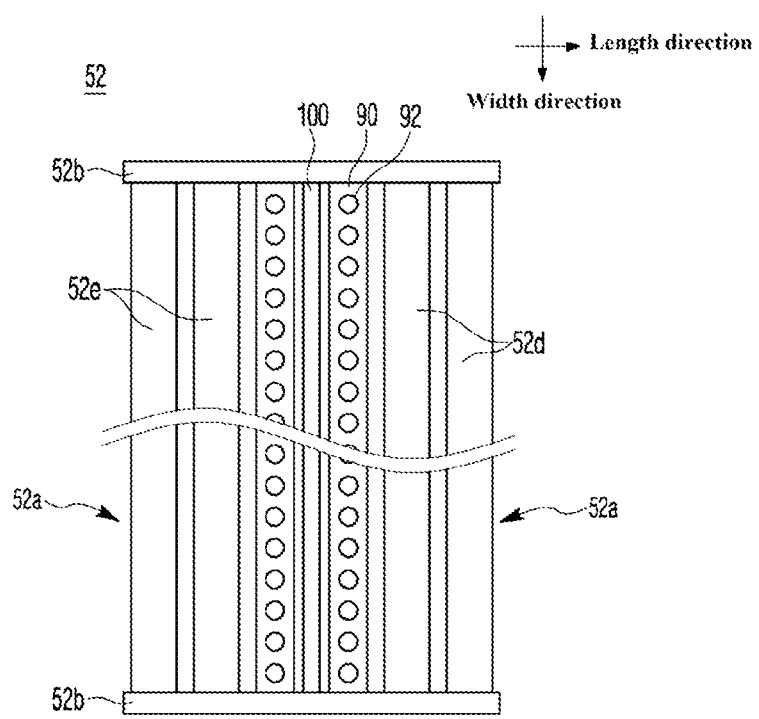

[FIG. 7]
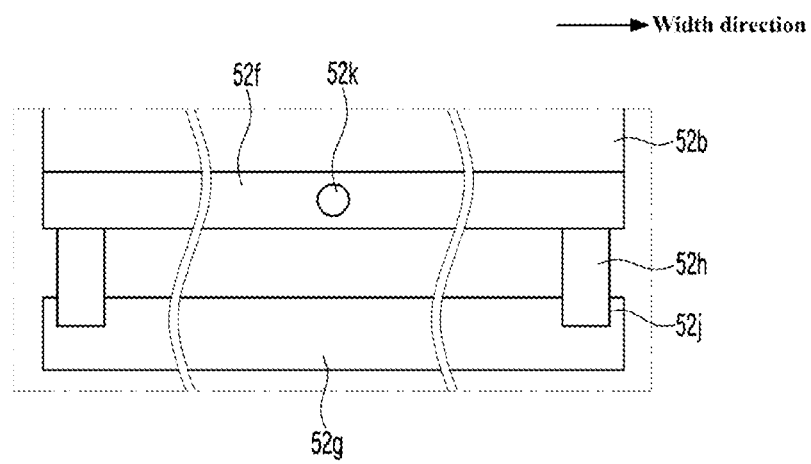

[FIG. 8]
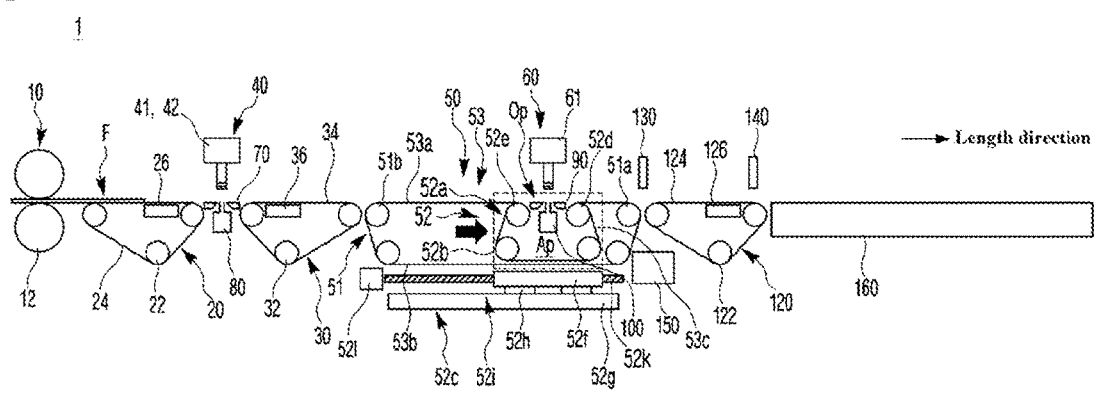

[FIG. 9]
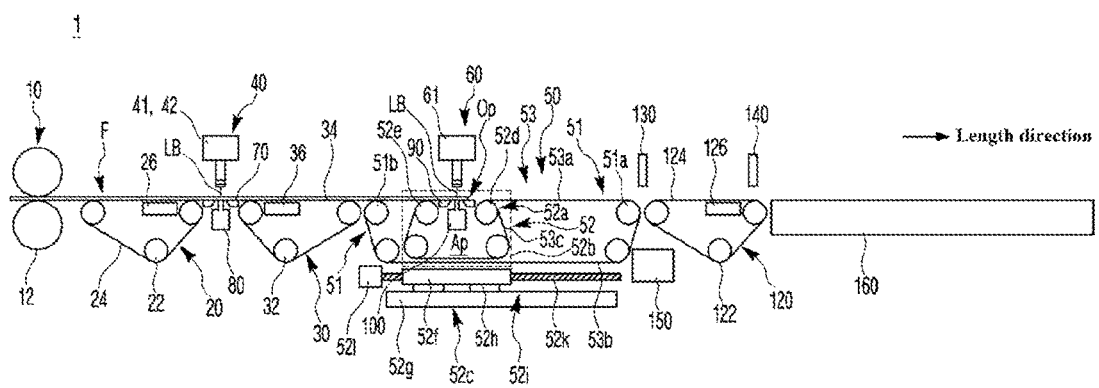

[FIG. 10]
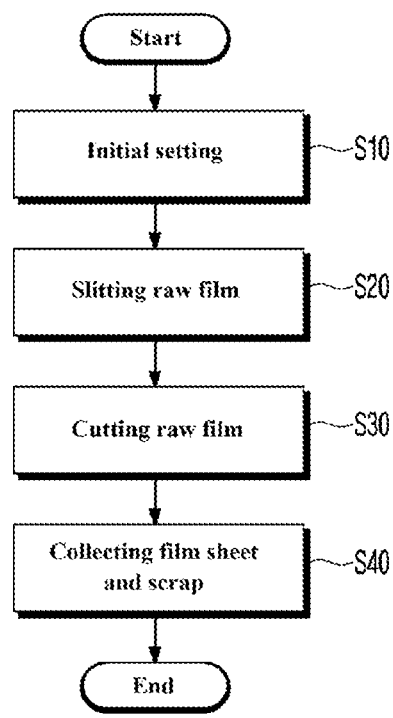

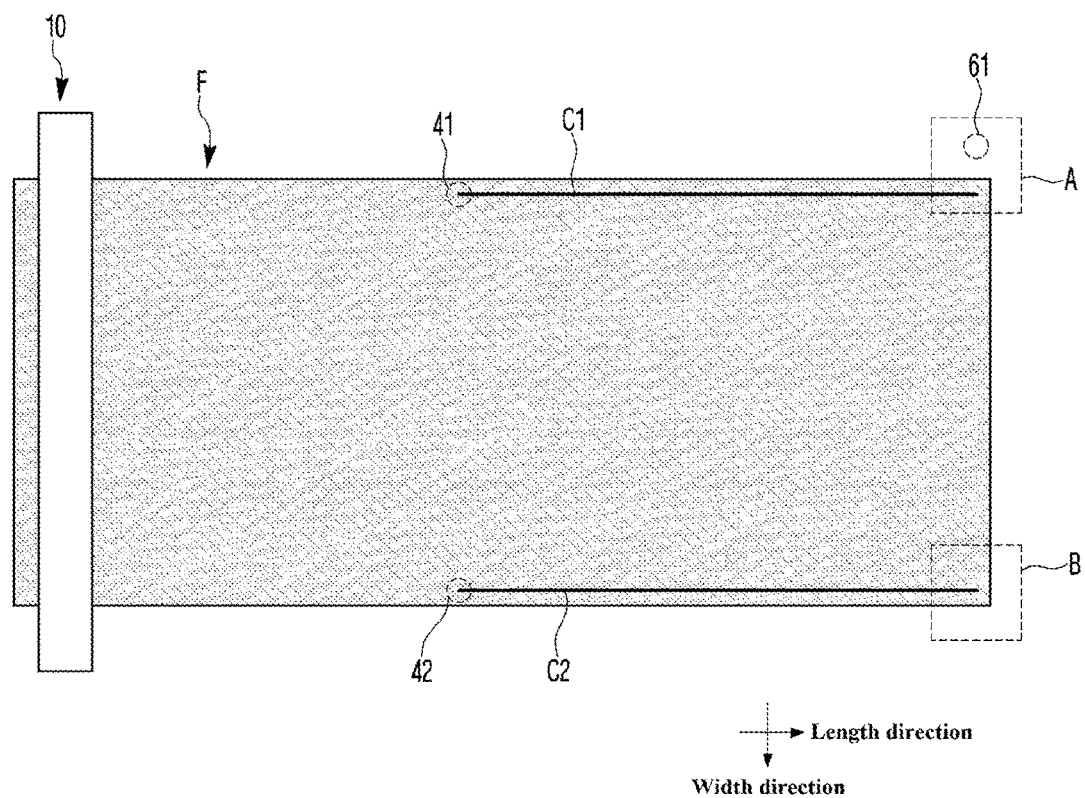
[FIG. 11]

[FIG. 12A]
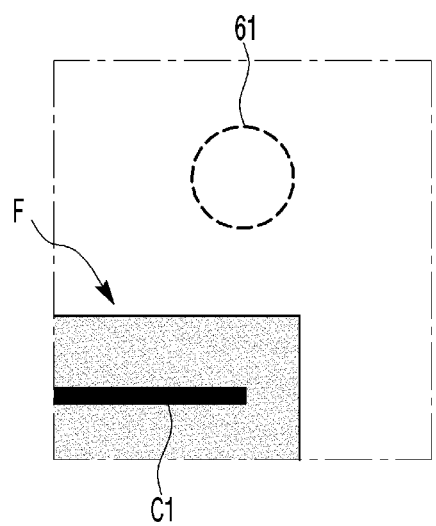

[FIG. 12B]
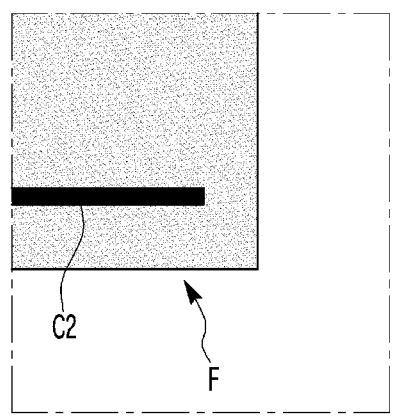

[FIG. 13]
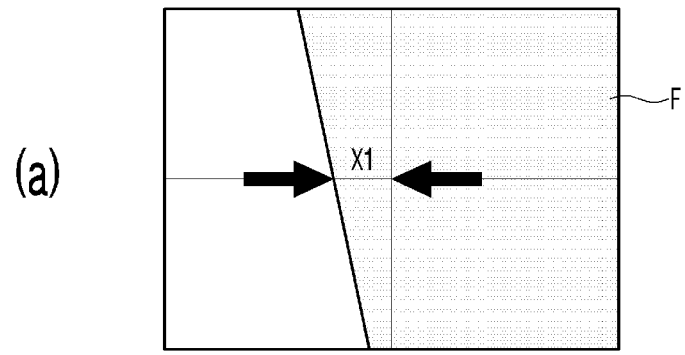
(a)
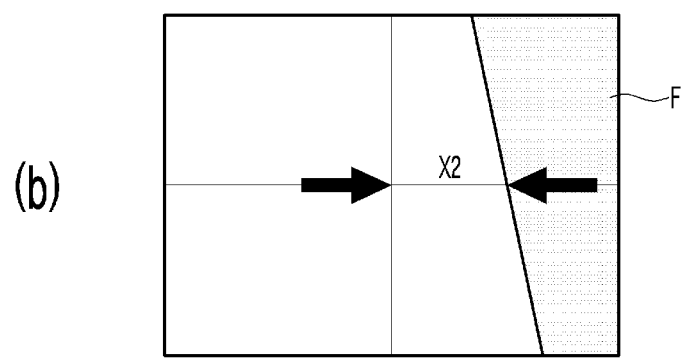
(b)
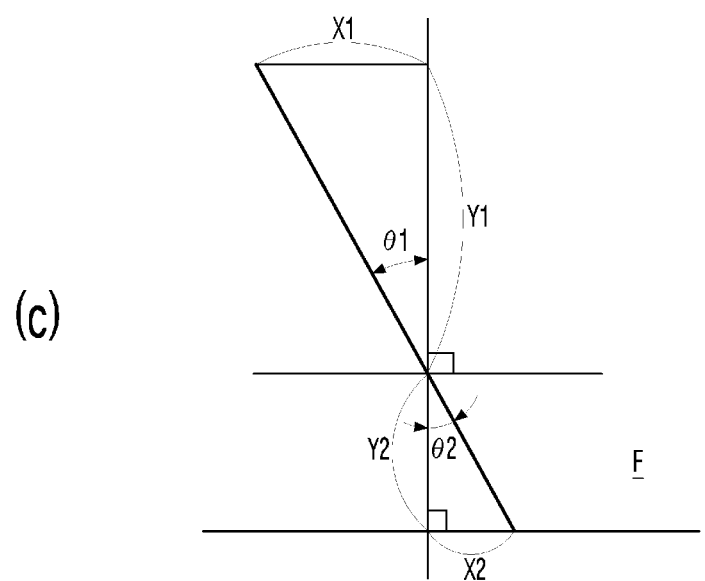
(c)

[FIG. 14]
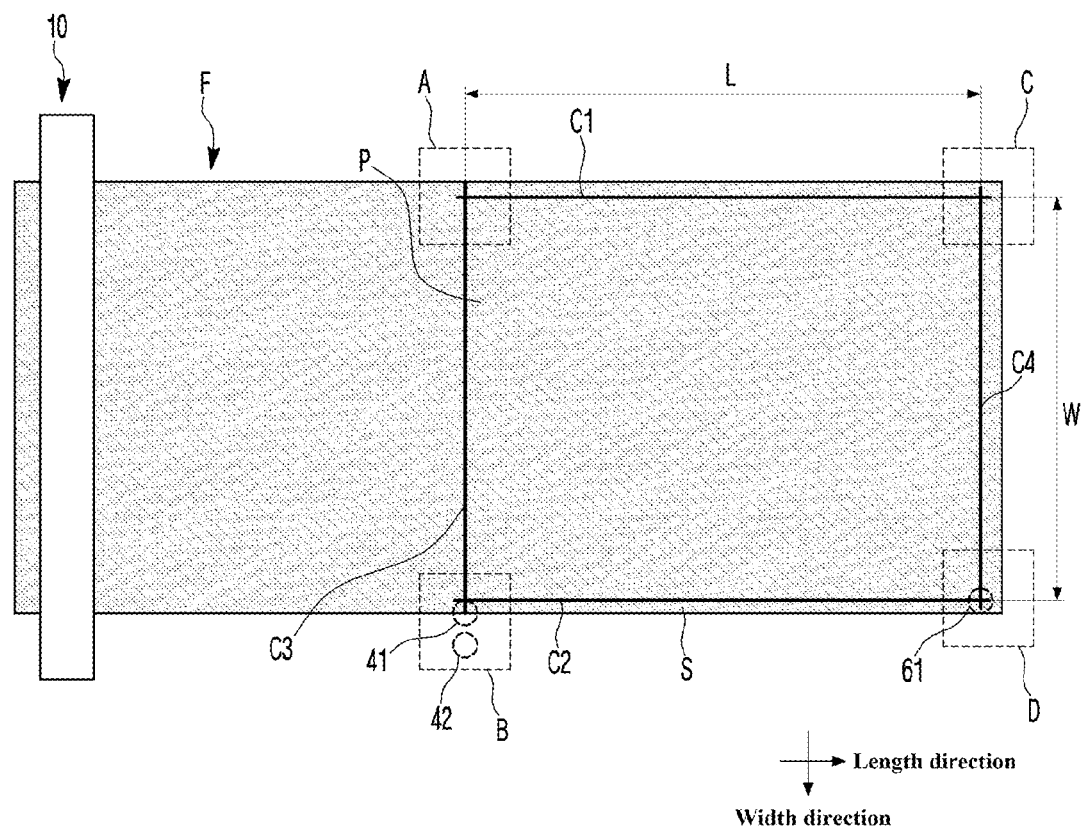

[FIG. 15A]
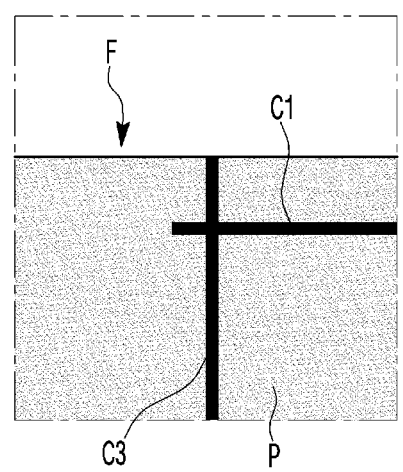

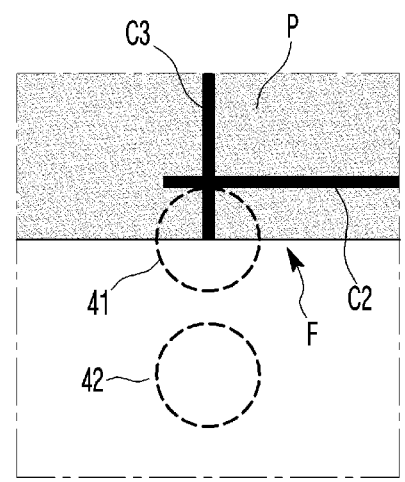
【FIG. 15B】

[FIG. 15C]
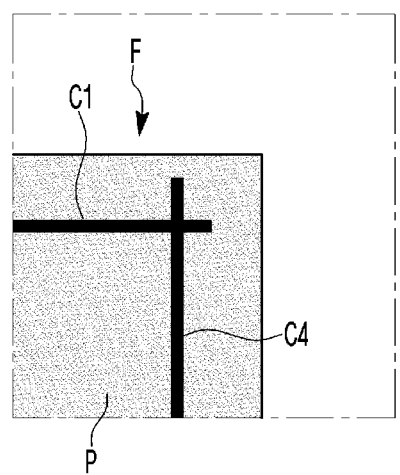

[FIG. 15D]
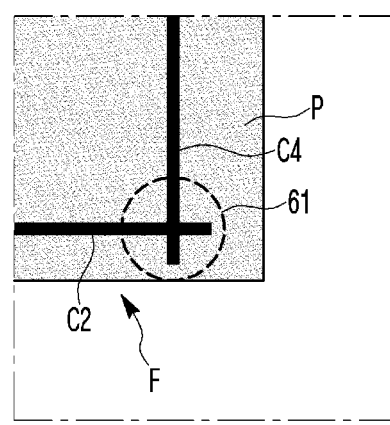

[FIG. 16]
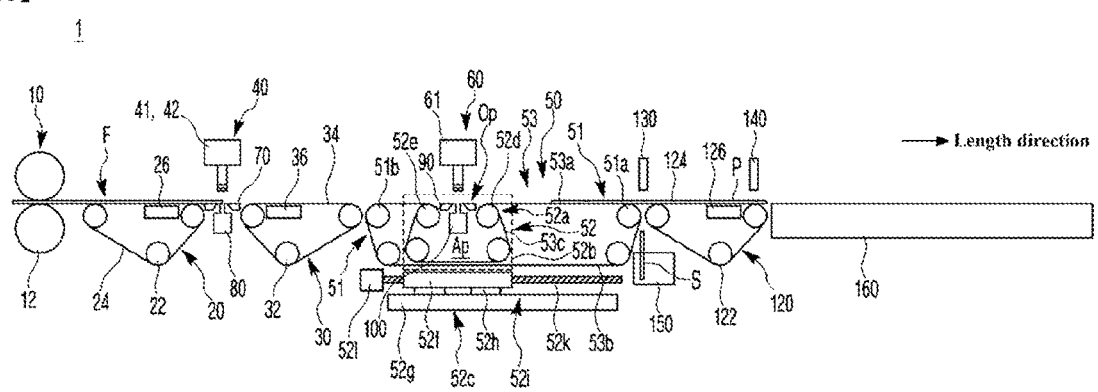

[FIG. 17]
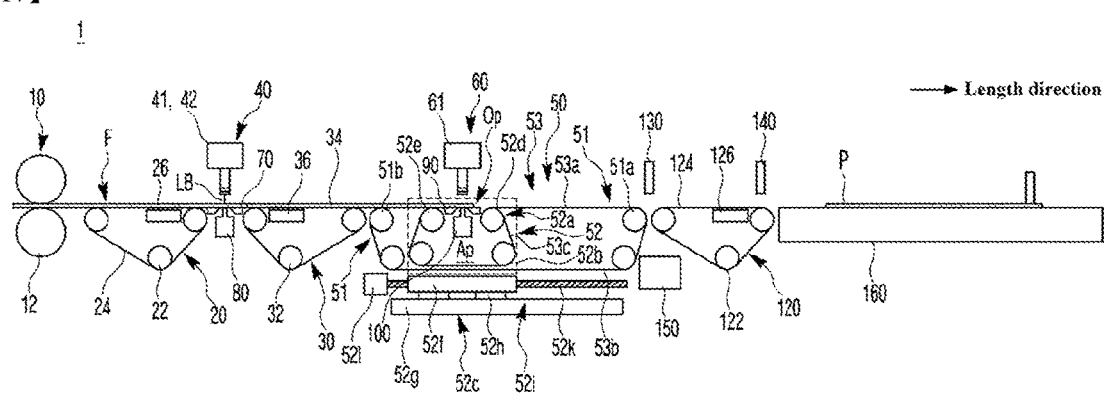

SYSTEM AND METHOD FOR CUTTING FILM

BACKGROUND

1. Field of the Invention

The present disclosure relates to a system and method for cutting a film.

2. Description of the Related Art

In general, a raw polarizing film for manufacturing a display panel is manufactured to have a strip shape elongated along a length direction, and then wound up in a roll shape on a supply roll and stored.

Thereafter, the raw polarizing film may be cut through a slitting process, in which the raw polarizing film is cut in the length direction to have a predetermined width, and a cutting process, in which the raw polarizing film is cut in the width direction such that a polarizing film sheet having a predetermined length is divided and formed from the raw polarizing film. Thereby, a polarizing film sheet having a size corresponding to the size of a display panel can be manufactured.

The manufacturing process of a raw polarizing film includes a stretching process of extending a raw polarizing film by applying tension to the raw polarizing film. The stretching process is mainly carried out using a stretching roller. Due to tolerances or limitations in the process, a tensional imbalance causing different tensions to be applied to parts of the raw polarizing film occurs. As a result, the elongation rate of the raw polarizing film varies across the raw film, and thus the raw polarizing film may have a curved structure or an eccentric structure that is curved in one direction. When a raw polarizing film having a curved structure or an eccentric structure is introduced into the cutting process, a meandering effect causing the raw polarizing film to be supplied in a misplaced state occurs.

Conventional technology has failed to propose a film cutting device and method capable of effectively controlling the cutting operation for the raw polarizing film according to the meandering pattern of the raw polarizing film to stably maintain the perpendicularity and dimensional accuracy of the polarizing film sheet at an appropriate level.

SUMMARY OF THE INVENTION

Therefore, the present disclosure has been made in view of the above problems, and it is an object of the present disclosure to provide an improved film cutting system and method capable of adjusting a cutting operation for a raw film according to the inclination pattern of the raw film.

It is another object of the present disclosure to provide an improved film cutting system and method capable of manufacturing products having various sizes.

It is another object of the present disclosure to provide an improved film cutting system and method capable of smoothly collecting remaining scraps after manufacturing a product using a raw film.

In accordance with the present disclosure, the above and other objects can be accomplished by the provision of a film cutting system for dividing and forming a film sheet having a predetermined unit width and unit length from a raw film by laser cutting of the raw film, the film cutting system including: a supply unit configured to intermittently supply the raw film by a predetermined unit supply length in a length direction of the raw film; a first laser unit including first and second laser nozzles each configured to radiate a laser beam onto the raw film, and a first head driver configured to convey the first laser nozzle and the second laser nozzle in a width direction of the raw film perpendicular to the length direction in a reciprocating manner; and a second laser unit including a laser nozzle disposed spaced apart from the first laser unit by the unit length in the length direction and configured to radiate a laser beam onto the raw film, and a second head driver configured to convey the laser nozzle in the width direction in a reciprocating manner, wherein, when the raw film is supplied by the supply unit, the first head driver dispose the first laser nozzle and the second laser nozzle so as to be spaced apart from each other by the unit width, and each of the first laser nozzle and the second laser nozzle radiates, in the length direction, the laser beam onto the raw film supplied by the supply unit to slit the raw film, and wherein, when the slitting of the raw film is completed, the supply unit stops supplying the raw film; the first head driver conveys one of the first laser nozzle and the second laser nozzle in the width direction; the second head driver conveys the laser nozzle in the width direction; and the one of the first laser nozzle and the second laser nozzle and the laser nozzle respectively radiate the laser beam onto the raw film in the width direction to cut the raw film to divide and form the film sheet from the raw film.

The film cutting system may further include an inclination measurement unit configured to measure an inclination angle of the raw film skewed with respect to the length direction, wherein, in cutting the raw film, the first driver conveyor may rotate the first head driver to rotate, by the inclination angle, a path of radiation of the laser beam emitted from the one of the first laser nozzle and the second laser nozzle onto the raw film, and the second driver conveyor may rotate the second head driver to rotate, by the inclination angle, a path of radiation of the laser beam emitted from the laser nozzle onto the raw film.

When the first laser nozzle slits the raw film, a first cutting line formed by laser cutting of the raw film in the length direction by the laser beam emitted from the first laser nozzle may be spaced apart from a front end of the raw film by a predetermined marginal distance, and wherein, when the second laser nozzle slits the raw film, a second cutting line formed by laser cutting of the raw film in the length direction by the laser beam emitted from the second laser nozzle may be spaced apart from the front end of the raw film by a predetermined marginal distance.

When one of the first laser nozzle and the second laser nozzle cuts the raw film, a third cutting line formed by laser cutting of the raw film in the width direction by the laser beam emitted from the one of the first laser nozzle and the second laser nozzle may cross the raw film in the width direction. When the laser nozzle cuts the raw film, each of both ends of a fourth cutting line formed by laser cutting of the raw film in the width direction by the laser beam emitted from the laser nozzle may be spaced apart from one side end or an opposite side end of the raw film by a predetermined marginal distance.

When the one of the first laser nozzle and the second laser nozzle cuts the raw film, the third cutting line may intersect the first cutting line and the second cutting line, and a rear end of the first cutting line and a rear end of the second cutting line may protrude from the third cutting line by a predetermined protrusion distance in a direction opposite to the length direction. When the laser nozzle cuts the raw film, the fourth cutting line may intersect the first and second cutting lines, and a front end of the first cutting line and a front end of the second cutting line may be protrude from the fourth cutting line by a predetermined protrusion distance in the length direction.

The film cutting system may further include a conveyance unit configured to convey the raw film supplied from the supply unit in the length direction, wherein the conveyance unit may include: fixed rollers fixedly arranged at predetermined positions, respectively; a variable roller assembly including variable rollers arranged to form a processing region for laser cutting of the raw film, and a roller conveyor configured to move the variable rollers in the length direction or in a direction opposite to the length direction in a reciprocating manner; and a conveyor belt wound around the fixed rollers and the variable rollers to form an endless track, wherein the raw film may be seated in a predetermined seating section such that one area of the raw film covers at least a portion of the processing region, wherein the second driver conveyor may be configured to convey the head driver and the laser nozzle coupled to the head driver in the length direction or in the direction opposite to the length direction in a reciprocating manner.

The second driver conveyance unit may convey the laser nozzle in the length direction or in the direction opposite to the length direction to make the laser nozzle spaced apart from the first laser nozzle and the second laser nozzle by the unit length, wherein the roller conveyor may convey the variable rollers in the length direction or in the direction opposite to the length direction to change a position of the processing region to make the laser beam emitted from the laser nozzle radiated onto the one area of the raw film covering the processing region.

The film cutting system may further include a suction fixed to the rotation support plate and arranged in the processing region to suck and remove foreign substances generated when the one area of the raw film covering the processing region is laser cut by the laser beam.

The suction may be arranged such that a position of a suction port of the suction coincides with a processing point of the raw film onto which the laser beam emitted from the laser nozzle is radiated.

The variable roller assembly may further include a rotation support plate rotatably coupled with each of the variable rollers, wherein the roller conveyor may convey the rotation support plate in a conveying direction or in the opposite direction to shift the processing region along the variable rollers.

The variable rollers may be arranged at predetermined intervals such that the processing region is partitioned by a curve section of the conveyor belt passing through the variable rollers while being bent according to arrangement of the variable rollers.

The film cutting system may further include an adsorption pad arranged in the processing region and fixed to the rotation support plate to vacuum-adsorb the one area of the raw film covering the processing region.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a side view schematically showing a configuration of a film cutting system according to an embodiment of the present disclosure;

FIG. 2 is a side view illustrating a method for slitting a raw film using a film supply device shown in FIG. 1;

FIG. 3 is a plan view schematically showing a configuration of laser units shown in FIG. 1;

FIG. 4 is a side view of a first driver conveying member and a first driver guide member of a first laser unit shown in FIG. 1;

FIG. 5 is a side view of a second driver conveying member and a second driver guide member of the first laser unit;

FIG. 6 is a plan view of a variable roller assembly shown in FIG. 1;

FIG. 7 is a front view of the roller conveyor shown in FIG. 1;

FIG. 8 is a side view illustrating a method for adjusting the size of a film sheet that may be manufactured using the film cutting system using a third conveyance unit shown in FIG. 1;

FIG. 9 is a side view illustrating a method for cutting a raw film using the film supply device shown in FIG. 1;

FIG. 10 is a flowchart illustrating a film cutting method using a film cutting system according to an embodiment of the present disclosure;

FIG. 11 is a plan view illustrating a method for slitting a raw film using the film cutting system shown in FIG. 1;

FIG. 12A is a partially enlarged view of area A of FIG. 11;

FIG. 12B is a partially enlarged view of area B of FIG. 11;

FIG. 13 is a view illustrating a method for measuring an inclination angle of a raw film using an inclination measurement unit shown in FIG. 3;

FIG. 14 is a plan view illustrating a method for cutting a raw film using the film cutting system shown in FIG. 1;

FIG. 15A is a partially enlarged view of area A of FIG. 14;
FIG. 15B is a partially enlarged view of area B of FIG. 14;
FIG. 15C is a partially enlarged view of area C of FIG. 14;
FIG. 15D is a partially enlarged view of area D of FIG. 14; and FIGS. 16 and 17 are views illustrating a method for collecting a film sheet and scraps using the film cutting system shown in FIG. 1.

DETAILED DESCRIPTION OF THE INVENTION

Hereinafter, some embodiments of the present disclosure will be described in detail with reference to exemplary drawings. It should be noted that, in assigning reference numerals to elements in the respective drawings, the same elements are assigned the same numerals although they are shown in different drawings. Further, in the following description of embodiments of the present disclosure, a detailed description of known elements or functions incorporated herein may be omitted to avoid obstructing understanding of the embodiments of the present disclosure.

Various terms such as first, second, A, B, (a), (b), etc., may be used solely for the purpose of differentiating one component from the other but neither imply nor suggest the substances, order or sequence of the components. Unless defined otherwise, all terms used herein, including technical or scientific terms, have the same meaning as commonly understood by one of ordinary skill in the art to which this invention belongs. Terms such as those defined in commonly used dictionaries should be interpreted as having a meaning that is consistent with their meaning in the context of this specification and the relevant art and will not be interpreted in an idealized or overly formal sense unless expressly so defined herein.

FIG. 1 is a side view schematically showing a configuration of a film cutting system according to an embodiment of the present disclosure, and FIG. 2 is a side view illustrating a method for slitting a raw film using a film supply device shown in FIG. 1.

A film cutting system 1 according to the embodiment of the present disclosure is an apparatus configured to process a raw film F by laser cutting to divide and form a film sheet P having a predetermined unit width W and a predetermined unit length L from the raw film F. The film cutting system 1 may include a supply unit 10, a first conveyance unit 20, a second conveyance unit 30, a first laser unit 40, a third conveyance unit 50, and a second laser unit 60.

The supply unit 10 is a device configured to supply the raw film F for laser cutting.

The raw film F has an elongated strip shape. The raw film F is stored by winding the film F on a supply roll (not shown) in a roll shape. The supply roll may unwind the raw film F wound in the roll shape and deliver the unwound film to the supply unit 10.

The supply unit 10 is configured to supply the raw film F delivered from the supply roll in a length direction (hereinafter, referred to as "the length direction") of the raw film F. For example, the supply unit 10 may include a pair of feeding rollers 12 configured to supply the raw film F delivered from the supply roll by pushing the raw film F in the length direction. The feeding rollers 12 are arranged such that the raw film F is interposed between the feeding rollers 12. Accordingly, when the feeding rollers 12 are driven to rotate, the feeding rollers 12 may supply the raw film F while pushing the same in the length direction.

Next, the first conveyance unit 20 is a device configured to convey the raw film F supplied from the supply unit 10 in the length direction.

The structure of the first conveyance unit 20 is not particularly limited. For example, the first conveyance unit 20 may be configured as a fixed conveyor belt device including first fixed rollers 22 and a first conveyor belt 24. The first conveyance unit 20 may be arranged such that the rear end thereof is spaced apart from the supply unit 10 by a predetermined distance in the length direction.

Each of the first fixed rollers 22 is fixedly arranged at a predetermined position. A part of the first fixed rollers 22 may be a drive roller arranged to be axially coupled to a drive motor (not shown), and the other part of the first fixed rollers 22 may be driven rollers arranged to be freely rotated.

The first conveyor belt 24 has a predetermined width and length such that the raw film F may be seated thereon, and is wound around the first fixed rollers 22 to form an endless track. Then, when the drive rollers between the first fixed rollers 22 are rotationally driven, the first conveyor belt 24 is conveyed along the endless track, and the driven rollers between the first fixed rollers 22 are rotated by the first conveyor belt 24 to guide the first conveyor belt 24 so as to be conveyed along the endless track.

According to the first conveyance unit 20, as shown in FIG. 1, the raw film F supplied from the supply unit 10 in the length direction may be seated on the first conveyor belt 24, and the first conveyor belt 24 may convey the raw film F seated in this way in the length direction.

The first conveyance unit 20 may further include a first adsorption member 26 capable of adsorbing the raw film F through adsorption holes (not shown) formed in the first conveyor belt 24 such that the raw film F may be adsorbed to the first conveyor belt 24 while being conveyed.

Next, the second conveyance unit 30 is a device configured to convey the raw film F passed through the first conveyance unit 20 in the length direction.

The structure of the second conveyance unit 30 is not particularly limited. For example, the second conveyance unit 30 may be configured as a fixed conveyor belt device including second fixed rollers 32 and a second conveyor belt 34. As shown in FIG. 1, the second conveyance unit 30 may be arranged such that the rear end thereof is spaced apart from the front end of the first conveyance unit 20 by a predetermined distance in the length direction.

Each of the second fixed rollers 32 is fixedly arranged at a predetermined position. A part of the second fixed rollers 32 may be a drive roller, and the other part of the second fixed rollers 32 may be driven rollers.

The second conveyor belt 34 has a predetermined width and length such that the raw film F may be seated thereon, and is wound around the second fixed rollers 32 to form an endless track.

According to the second conveyance unit 30, as shown in FIG. 2, the raw film F passed through the first conveyance unit 20 may be seated on the second conveyor belt 34. The second conveyor belt 34 may convey the raw film F seated in this way in the length direction.

The second conveyance unit 30 may further include a second adsorption member 36 capable of vacuum adsorption of the raw film F through adsorption holes (not shown) formed in the second conveyor belt 34.

The film cutting system 1 may further include the first adsorption pad 70 arranged between the first conveyance unit 20 and the second conveyance unit 30 and configured to adsorb and fix the raw film F when the raw film F is cut with laser by the first laser unit 40, and a first suction 80 arranged between the first conveyance unit 20 and the second conveyance unit 30 and configured to suck and remove fume generated when the raw film F is cut with laser by the first laser unit 40.

As shown in FIG. 2, the first adsorption pad 70 is arranged to face the bottom of one area of the raw film F that covers the gap between the first conveyance unit 20 and the second conveyance unit 30. A pair of first adsorption pads 70 may be arranged such that the suction port of the first suction 80 is positioned between the first adsorption pads 70, but embodiments are not limited thereto. Each of the first adsorption pads 70 may be provided with a plurality of adsorption holes arranged at predetermined intervals to vacuum adsorb and fix the raw film F, but embodiments are not limited thereto. When a laser beam LB emitted from each of the laser nozzles 41 and 42 of the first laser unit 40 to be described later is radiated onto the raw film F, the first adsorption pads 70 may fix the raw film F through vacuum adsorption to maintain a constant distance between the raw film F and the laser nozzles 41 and 42, thereby improving the laser processing quality of the raw film F.

The first suction 80 is arranged such that the suction port faces the bottom of one area of the raw film F covering the gap between the first conveyance unit 20 and the second conveyance unit 30, and such that the location of the suction port coincides with a processing point to which the laser beam LB emitted from each of the laser nozzles 41 and 42 is radiated. In addition, the first suction 80 may be connected to an external vacuum pump (not shown). The first suction 80 may suck and remove fume generated during laser-cutting of the raw film F using a vacuum pressure applied by the vacuum pump.

FIG. 3 is a plan view schematically showing a configuration of the laser units shown in FIG. 1, FIG. 4 is a side view of a first driver conveying member and a first driver guide member of the first laser unit shown in FIG. 1, and FIG. 5 is a side view of a second driver conveying member and a second driver guide member of the first laser unit.

Next, the first laser unit 40 is a device configured to slit or cut the raw film F by laser cutting using a laser beam LB.

As shown in FIGS. 2 and 3, the first laser unit 40 may include a first laser nozzle 41 and a second laser nozzle 42 configured to receive a laser beam LB oscillated from a laser oscillator (not shown) and radiate the same onto the raw film F, and a first head driver 43 configured to convey each of the laser nozzles 41 and 42 in a width direction (hereinafter referred to as "the width direction") of the raw film F, which is perpendicular to the length direction.

The laser nozzles 41 and 42 are disposed at positions where the laser nozzles are allowed to radiate a laser beam LB to one area of the raw film F that covers or passes through the gap between the first conveyance unit 20 and the second conveyance unit 30, respectively.

The first head driver 43 may have a first slider 44 and a second slider 45 which are individually moved in the width direction of the raw film F by a drive motor and other driving members. The first laser nozzle 41 may be coupled to the first slider 44, and the second laser nozzle 42 may be coupled to the second slider 45. Accordingly, the first head driver 43 may convey the first laser nozzle 41 in the width direction of the raw film F through the first slider 44, and convey the laser nozzle 42 in the width direction of the raw film F through the second slider 45.

The first laser unit 40 may further include a first support 46 arranged to support one end 43a of both ends 43a and 43b of the first head driver 43, a second support 47 arranged to support an opposite end 43b opposite to the one end 43a between the both ends 43a and 43b of the first head driver 43, and a first driver conveyor 48 configured to convey the first head driver 43 in the length direction or a direction opposite to the length direction or adjust an angle formed between the first head driver 43 and the length direction.

The structure of the first driver conveyor 48 is not particularly limited. For example, the first driver conveyor 48 may include a first rotation support body 48a configured to rotatably support the one end 43a of the first head driver 43, a second rotation support body 48b configured to rotatably support the opposite end 43b of the first head driver 43, a first driver conveying member 48c configured to move each of the ends 43a and 43b of the first head driver 43 in the length direction or the opposite direction to the length direction individually in a reciprocating manner, and a driver guide member 48d configured to remove a tension acting on the first head driver 43 when the both ends of the first head driver 43 are individually conveyed by the driver conveying member 48c.

As shown in FIG. 4, the first rotation support body 48a may be arranged to be interposed between a first driver guide member 48k, which will be described later, and the one end 43a of the first head driver 43, and may rotatably support the one end 43a of the first head driver 43.

As shown in FIG. 5, the second rotation support body 48b may be arranged to be interposed between a second driver guide member 48l, which will be described later, and may rotatably support the opposite end 43b of the first head driver 43.

As shown in FIGS. 4 and 5, the driver conveying member 48c is configured to move the ends 43a and 43b of the first head driver 43 individually in the length direction or the direction opposite to the length direction in a reciprocating manner. To this end, the driver conveying member 48c may include a first driver conveying member 48e configured to move the one end 43a of the first head driver 43 in the length direction or in the direction opposite to the length direction in a reciprocating manner, and a second driver conveying member 48f configured to move the opposite end 43b of the head driver 43 in the length direction or the opposite direction to the length direction in a reciprocating manner.

As shown in FIG. 4, the first driver conveying member 48e is arranged to be interposed between the first support 46, which is fixed to the ground, and the first driver guide member 48k. The first driver conveying member 48e may include a first conveying rail 48g extending in the length direction of the first support 46, and a first conveying motor 48h coupled to the first driver guide member 48k and configured to move along the first conveying rail 48g in a reciprocating manner. The first convey motor 48h may be configured as a linear motor movable along the first conveying rail 48g by electromagnetic force, but embodiments are not limited thereto.

Referring to FIG. 3, as the first driver conveying member 48e is configured as described above, when the first conveying motor 48h moves in the length direction or the opposite direction to the length direction along the first conveying rail 48g, the first driver guide member 48k, the first rotation support body 48a, and the one end 43a of the first head driver 43, which are sequentially connected to the first conveying motor 48h, may move together with the first conveying motor 48h in the length direction or in the opposite direction to the length direction.

However, the opposite end 43b of the first head driver 43 is rotatably supported by the second rotation support body 48b. Accordingly, as shown in FIG. 3, when the first driver conveying member 48e move the one end 43a of the first head driver 43 in the length direction or the opposite direction to the length direction with the opposite end 43b of the first head driver 43 remaining stopped, the first head driver 43 is rotated around the opposite end 43b to change the angle formed between the first head driver 43 and the length direction. Thereby, the angle formed by the conveyance path of the laser nozzles 41 and 42 and the radiation path of the laser beam LB emitted from the laser nozzles 41 and 42 with respect to the length direction may be changed by the angle by which the first head driver 43 is rotated by the first driver conveying member 48e.

As shown in FIG. 5, the second driver conveying member 48f is arranged to be interposed between the second support 47, which is fixed to the ground, and the second driver guide member 48l. The second driver conveying member 48f may have a second conveying rail 48i formed on the second support 47 to extend in the length direction, a second conveying motor 48j coupled to the second driver guide member 48l and configured to move along the second conveying rail 48i in a reciprocating manner.

Referring to FIG. 3, as the second driver conveying member 48f is configured as described above, when the second driver conveying member 48f move the opposite end 43b of the first head driver 43 in the length direction or in the opposite direction to the length direction with the one end 43a of the first head driver 43 remaining stopped, the first head driver 43 rotates around the one end 43a to change the angle formed between the first head driver 43 and the length direction. Thereby, the angle formed by the conveyance path of the laser nozzles 41 and 42 and the radiation path of the laser beam LB emitted from the laser nozzles 41 and 42 with respect to the length direction may be changed as much as the angle by which the first head driver 43 is rotated by the second driver conveying member 48f.

On the other hand, when the first and second driver conveying members 48e and 48f simultaneously convey the first head driver 43 to both ends 43*a* and 43*b* in the length direction or the opposite direction to the length direction, the first head driver 43 may be conveyed in the length direction or the opposite direction to the length direction. Thereby, the first and second driver conveying members 48*e* and 48*f* may adjust the arrangement position of the first head driver 43 with respect to the length direction.

The first laser unit 40 may be provided with a laser scanner capable of adjusting the radiation path of the laser beam LB within a predetermined scan range using a galvanometer (not shown) instead of the laser nozzles 41 and 42. Thus, a laser scanner may be used in place of the first driver conveyor 48 to change the radiation path of the laser beam LB.

The driver guide member 48*d* is arranged to guide the movement of the first head driver 43 in the width direction of the raw film F or a direction opposite to the width direction. The first head driver 43 is rotated around the one end 43*a* or the opposite end 43*b* of the first head driver 43 by the driver conveying member 48*c*, but the length of the first head driver 43 is not variable. Accordingly, tension may be applied to the first head driver 43 when the first head driver 43 is rotated. Since there is a possibility that the first head driver 43 may be damaged by such tension, the driver guide member 48*d* is provided to address this issue.

The driver guide member 48*d* may include a first driver guide member 48*k* configured to guide the movement of the one end 43*a* of the first head driver 43 in the width direction or the opposite direction to the width direction, and a second driver guide member 48*l* configured to guide the movement of the opposite end 43*b* of the head driver 43 in the width direction or the opposite direction to the width direction.

As shown in FIG. 4, the first driver guide member 48*k* may include a first part 48*m* having at least one guide groove 48*o* extending in the width direction, the first part 48*m* being coupled to a bottom surface of the first rotation support body 48*a*, and a second part 48*n* having at least one guide protrusion 48*p* slidably mounted in the guide groove 48*o* of the first part 48*m* to move in the width direction or the opposite direction of the width direction, the second part 48*n* being coupled to a top surface of the first conveying motor 48*h* of the first driver conveying member 48*e*.

Also, as shown in FIG. 5, the second driver guide member 48*l* may include a first part 48*q* having at least one guide groove 48*v* extending in the width direction, the first part 48*m* being coupled to a bottom surface of the second rotation support body 48*b*, and a second part 48*r* having at least one guide protrusion 48*w* slidably mounted in the guide groove 48*v* of the first part 48*q* to move in the width direction or the opposite direction of the width direction, the second part 48*r* being coupled to a top surface of the second conveying motor 48*j* of the second driver conveying member 48*f*.

As shown in FIG. 3, when the one end 43*a* of the first head driver 43 is moved in the length direction or the opposite direction to the length direction, and tension is applied to the first head driver 43 while the first head driver 43 is rotated around the opposite end 43*b*, the guide groove 48*v* may slide along the guide protrusion 48*w* in the width direction or the opposite direction to the width direction. Thereby, the first part 48*q*, the second rotation support body 48*b*, and the opposite end 43*b* of the first head driver 43 may be moved in the width direction or the opposite direction to the width direction.

In addition, as shown in FIG. 3, when the opposite end 43*b* of the first head driver 43 is moved in the length direction or the opposite direction to the length direction, and the first head driver 43 is rotated around the one end 43*a* and is subjected to tension, the guide groove 48*o* may slide along the guide protrusion 48*p* in the width direction or the opposite direction to the width direction. Thereby, the first part 48*m*, the first rotation support body 48*a*, and the one end 43*a* of the first head driver 43 may be moved in the width direction or the opposite direction to the width direction.

As described above, according to the drive guide member 48*d*, when the first head driver 43 is rotated around the one end 43*a* or the opposite end 43*b*, the guide grooves 48*o* and 48*v* may slide along the guide protrusions 48*p* and 48*w*, and the tension acting on the first head driver 43 may be removed. Thereby, the tension acting on the first head driver 43 may be prevented from damaging the first head driver 43.

FIG. 6 is a plan view of a variable roller assembly shown in FIG. 1, and FIG. 7 is a front view of the roller conveyor shown in FIG. 1. FIG. 8 is a side view illustrating a method for adjusting the size of a film sheet that may be manufactured using the film cutting system using a third conveyance unit shown in FIG. 1, and FIG. 9 is a side view illustrating a method for cutting a raw film using the film supply device shown in FIG. 1.

Next, the third conveyance unit 50 is a device configured to convey the raw film F or the film sheet P passed through the second conveyance unit 30 in the length direction.

The structure of the third conveyance unit 50 is not particularly limited. For example, as shown in FIG. 2, the third conveyance unit 50 may include fixed rollers 51, a variable roller assembly 52, and a conveyor belt 53. The third conveyance unit 50 may be arranged such that the rear end thereof is spaced apart from the front end of the second conveyance unit 30 by a predetermined distance in the length direction.

The fixed rollers 51 are rollers that are fixedly arranged at a predetermined position between all the rollers included in the third conveyance unit 50.

The arrangement positions of the fixed rollers 51 are not particularly limited. For example, as shown in FIG. 2, the fixed rollers 51 may include first fixed rollers 51*a* arranged to be spaced apart from the variable roller assembly 52 in the length direction, and second fixed rollers 51*b* arranged to be spaced apart from the variable roller assembly 52 in the opposite direction to the length direction. The first fixed rollers 51*a* may be disposed to be spaced farther apart from the supply unit 10 than from the variable roller assembly 52, and the second fixed rollers 51*b* may be positioned between the variable roller assembly 52 and the supply unit 10.

The number of fixed rollers 51 is not particularly limited. For example, as shown in FIG. 2, a pair of first and second fixed rollers 51*a* and 51*b* may be arranged at a predetermined distance from each other in the thickness direction of the raw film F. In this case, the first fixed roller 51*a* on the upper side between the first fixed rollers 51*a* and the second fixed roller 51*b* on the upper side between the second fixed rollers 51*b* may be arranged at the same height as the raw film F supplied by the supply unit 10 or at a position lower than the position of the raw film F supplied by the supply unit 10 by the thickness of the conveyor belt 53. In addition, the first fixed roller 51*a* on the lower side between the first fixed rollers 51*a* and the second fixed roller 51*b* on the lower side between the second fixed rollers 51*b* may be arranged at positions lower by a predetermined distance than the positions of the first fixed roller 51*a* on the upper side and the second fixed roller 51*b* on the upper side, respectively.

A part of the fixed rollers 51 may be a drive roller, and the other part of the fixed rollers 51 may be driven rollers.

The variable roller assembly 52 is configured to form a processing region Ap in which laser processing of the raw film F is performed, and the position of the processing region Ap may be variable.

The structure of the variable roller assembly 52 is not particularly limited. For example, the variable roller assembly 52 may have variable rollers 52*a*, a rotation support plate 52*b*, and a roller conveyor 52*c*.

The variable rollers 52*a* are rollers arranged such that the arrangement positions thereof are changeable between all rollers included in the third conveyance unit 50.

The variable rollers 52*a* are arranged in a space between the first fixed rollers 51*a* and the second fixed rollers 51*b*. For example, the variable rollers 52*a* may include first variable rollers 52*d* arranged in a space between the first fixed rollers 51*a* and the second fixed rollers 51*b*, and second variable rollers 52*e* arranged in a space between the first variable rollers 52*d* and the second fixed rollers 51*b*.

The number of the installed variable rollers 52*a* is not particularly limited. For example, a pair of first and second variable rollers 52*d* and 52*e* may be arranged at predetermined distance in the thickness direction of the raw film F. In this case, as shown in FIG. 2, the first variable roller 52*d* on the upper side between the first variable rollers 52*d* and the second variable roller 52*e* on the upper side between the second variable rollers 52*e* may be arranged at the same height as the raw film F supplied by the supply unit 10 or at a position lower by the thickness of the conveyor belt 53 than the position of the raw film F supplied by the supply unit 10. In addition, the first variable roller 52*d* on the lower side between the first variable rollers 52*d* and the second variable roller 52*e* on the lower side between the second variable rollers 52*e* may be arranged at positions higher by a predetermined height than the positions of the first fixed roller 51*a* on the lower side between the first fixed rollers 51*a* and the second fixed roller 51*b* on the lower side between the second fixed rollers 51*b*, respectively.

The rotation support plate 52*b* is arranged to rotatably support the variable rollers 52*a*. To this end, as shown in FIG. 6, a pair of rotation support plates 52*b* may be provided. One-side ends of the variable rollers 52*a* are rotatably coupled to one of the rotation support plates 52*b*, and the opposite-side ends of the variable rollers 52*a* are rotatably coupled to the other one of the rotation support plates 52*b*. Thus, each of the rotation support plates 52*b* may rotatably support the variable rollers 52*a* and maintain a constant distance between the variable rollers 52*a*. In addition, as shown in FIG. 7, the rotation support plates 52*b* may be connected to each other by a connection plate 52*f* fixed to one end of each of the rotation support plate 52*b*.

The roller conveyor 52*c* is configured to convey the variable rollers 52*a* together in the length direction or the opposite direction to the length direction.

The structure of the roller conveyor 52*c* is not particularly limited. For example, as shown in FIG. 2, the roller conveyor 52*c* may have a guide rail 52*g*, a guide block 52*h*, and a driving member 52*i*.

The guide rail 52*g* is formed to extend along the length direction. The guide rail 52*g* may be arranged under the conveyor belt 53, but embodiments are not limited thereto. As shown in FIG. 7, at least one guide groove 52*j* may be concavely formed on one surface (e.g., the top surface) of the guide rail 52*g* along the length direction.

The guide block 52*h* is fixed to the rotation support plate 52*b*, and is slidably mounted on the guide rail 52*g* so as to move in the length direction or in the opposite direction to the length direction. For example, as shown in FIG. 7, the upper end of the guide block 52*h* may be fixed to the bottom of the connection plate 52*f*, and the lower end of the guide block 52*h* may be slidably mounted in the guide groove 52*j*) of the guide rail 52*g*. In addition, the number of the guide blocks 52*h* is not particularly limited. The number of the provided guide blocks 52*h* may be equal to the number of the provided guide grooves 52*j*.

The structure of the driving member 52*i* is not particularly limited. For example, as shown in FIG. 2, the driving member 52*i* may have a lead screw 52*k* screwed to the connection plate 52*f* along the length direction, and a drive motor 52*l* configured to rotatably drive the lead screw 52*k*. Thus, as shown in FIG. 8, depending on the rotation direction of the drive motor 52*l*, the guide block 52*h*, the connection plate 52*f* connected to the guide block 52*h*, the rotation support plate 52*b*, and the variable roller 52*a* may be moved together in the length direction or in the opposite direction to the length direction.

When the variable roller assembly 52 is arranged as described above, as shown in FIG. 8, the connection plate 52*f*, the rotation support plate 52*b*, and the variable rollers 52*a* may be conveyed together by the roller conveyor 52*c* in the length direction or in the opposite direction to the length direction.

The conveyor belt 53 is wound around the fixed rollers 51 and the variable rollers 52*a* so as to form an endless track. Accordingly, the conveyor belt 53 may be moved along the endless track by rotational driving of the fixed roller 51 corresponding to the above-described drive roller between the fixed rollers 51 in a bent state according to the arrangement of the rollers. The above-described driven rollers between the fixed rollers 51 may be rotated by the conveyor belt 53, while guiding movement of the conveyor belt 53.

The conveyor belt 53 is arranged such that the raw film F passed through the second conveyance unit 30 is seated in a predetermined seating section 53*a* in the entire section of the conveyor belt 53. The position of the seating section 53*a* is not particularly limited. For example, as shown in FIG. 8, the seating section 53*a* may be an upper section of the entire section of the conveyor belt 53 positioned between the first fixed roller 51*a* positioned on the upper side between the first fixed rollers 51*a* and the second fixed roller 51*b* positioned on the upper side between the second fixed rollers 51*b*.

The drive motor axially coupled to the drive roller may rotate the drive roller in a predetermined rotation direction such that the seating section 53*a* is conveyed in the length direction. Then, as the seating section 53*a* is moved in the length direction, the raw film F seated in the seating section 53*a* may be conveyed in the length direction. At this time, a return section 53*b* positioned on the side opposite to the seating section 53*a* in the entire section of the conveyor belt 53 may be moved in the opposite direction to the length direction. The position of the return section 53*b* is not particularly limited. For example, when the seating section 53*a* is the upper section of the conveyor belt 53, the return section 53*b* may be a lower section of the conveyor belt 53 positioned between the first fixed roller 51*a* positioned on the lower side between the first fixed rollers 51*a* and the second fixed roller 51*b* positioned on the lower side between the second fixed rollers 51*b* in the entire section of the conveyor belt 53.

As shown in FIG. 8, the seating section 53*a* of the conveyor belt 53 is wound on the first variable rollers 52*d* and the second variable rollers 52*e* in pre-determined order. For example, the seating section 53*a* of the conveyor belt 53 is wound on the first variable rollers 52*d* and the second variable rollers 52e in order of the first variable roller 52d positioned on the upper side between the first variable rollers 52d, and the first variable roller 52d positioned on the lower side between the first variable rollers 52d, the second variable roller 52e positioned on the lower side between the second variable rollers 52e, and the second variable roller 52e positioned on the upper side between the second variable rollers 52e.

Then, in the seating section 53a of the conveyor belt 53, a curve section 53c passing through the variable rollers 52a is formed while being bent according to the arrangement of the variable rollers 52a. As shown in FIG. 8, the curve section 53c has a shape that is recessed from the seating section 53a toward the return section 53b. According to the curve section 53c, a processing region Ap having a U-shaped cross section is formed in the seating section 53a. That is, the variable rollers 52a form the processing region Ap partitioned by the curve section 53c of the conveyor belt 53. The processing region Ap has an opening Op opened toward the seating section 53a.

The processing region Ap may be used as a space for laser processing of the raw film F. To the end, as shown in FIG. 9, the film cutting system 1 may include a second adsorption pad 90 disposed in the opening Op of the processing region Ap and configured to adsorb and fix the raw film F when the raw film F is laser cut by the second laser unit 60, and a second suction 100 disposed in the opening Op of the processing region Ap and configured to suck and remove fume formed when the raw film F is laser cut by the second laser unit 60. Each of the second adsorption pad 90 and the second suction 100 may be fixed to at least one of the rotation support plates 52b so as to be positioned between the rotation support plates 52b.

In addition, as shown in FIG. 9, the second adsorption pad 90 is arranged to face the bottom surface of the raw film F covering the processing region Ap. A pair of the second adsorption pads 90 may be arranged such that the suction port of the second suction 100 is positioned between the second adsorption pads 90, but embodiments are not limited thereto. A plurality of adsorption holes 92 (shown in FIG. 6) capable of vacuum-adsorbing and fixing the raw film F may be formed in each of the second adsorption pads 90 at predetermined intervals, but embodiments are not limited thereto. When the laser beam LB emitted from the laser nozzle 61 of the second laser unit 60, which will be described later, is radiated onto the raw film F, the second adsorption pad 90 may fix the raw film F through vacuum adsorption to maintain a constant distance between the raw film F and the laser nozzle 61. Thereby, the laser processing quality of the raw film F may be improved.

In addition, the second suction 100 may be arranged such that the suction port faces the bottom surface of the raw film F covering the processing region Ap, and may be connected to an external vacuum pump (not shown). The second suction 100 may suck and remove fume generated during laser cutting of the raw film F, using a vacuum pressure applied by the vacuum pump.

As described above, the variable rollers 52a, the rotation support plates 52b, the second adsorption pad 90, the second suction 100, and the like may be conveyed in a reciprocating manner in the length direction or the direction opposite to the length direction by the roller conveyor 52c. Then, when the variable rollers 52a are conveyed by the roller conveyor 52c, the positions where the curve section 53c and the processing region Ap of the conveyor belt 53 are formed, and the positions where the second adsorption pad 90 and the second suction 100 are arranged may be moved together along the variable rollers 52a.

In order to change the unit length L of the film sheet P to be divided from the raw film F, the position of the processing point on the raw film F to which the laser beam LB emitted from the laser nozzle 61 is radiated must be changed in the length direction or in the opposite direction to the length direction by moving the laser nozzle 61 of the second laser unit 60, which will be described later, in the length direction or in the opposite direction to the length direction.

When the position of the laser nozzle 61 is shifted in the length direction or in the opposite direction to the length direction as described above, the conveyor belt 53 and other elements may be damaged by the laser beam LB emitted from the laser nozzle 61, or the original film F may not be cut by the assistance of the second adsorption pad 90 and the second suction 100, and thus the laser processing quality of the original film F may be deteriorated unless the arrangement positions of the seating section 53a of the conveyor belt 53, the second adsorption pad 90 and the second suction 100 are not changed according to the changed position of the processing point.

The third conveyance unit 50 is configured as a variable conveyor belt device capable of moving the seating section 53a of the conveyor belt 53, the second adsorption pad 90 and the second suction 100 in the length direction or the opposite direction to the length direction. Accordingly, when the position of the laser nozzle 61 is changed in the length direction or in the opposite direction to the length direction, the third conveyance unit 50 may change the positions of the seating section 53a of the conveyor belt 53, the second adsorption pad 90, and the second suction 100 in the length direction or in the opposite direction to the length direction such that the position of the processing point matches the position of the suction port of the second suction 100. Thereby, the third conveyance unit 50 may provide a degree of freedom allowing film sheets P of various sizes to be manufactured using the film cutting system 1, and prevent damage to the conveyor belt 53. In addition, laser cutting of the raw film F may be performed using the laser nozzle 61 under the assistance of the second adsorption pad 90 and the second suction 100. Thereby, the laser processing quality of the raw film F may be improved.

Next, the second laser unit 60 is a device configured to perform laser cutting of the raw film F using a laser beam LB.

As shown in FIG. 3, the second laser unit 60 may include a laser nozzle 61 configured to receive the laser beam LB oscillated from a laser oscillator (not shown) and radiate the same onto the raw film F, and a second head driver 62 configured to convey the laser nozzle 61 in the width direction of the raw film F.

The second head driver 62 may have a slider 63 moved in the width direction by the drive motor and other driving members. In addition, the laser nozzle 61 may be coupled to the slider 63. Accordingly, the second head driver 62 may convey the laser nozzle 61 in the width direction through the slider 63.

The second laser unit 60 may further include a first support 64 arranged to support one end 62a of both ends 62a and 62b of the second head driver 62, a second support 65 (shown in FIG. 3) arranged to support an opposite end 62b opposite to the one end 62a between the both ends 62a and 62b of the second head driver 62, and a second driver conveyor 66 (shown in FIG. 3) configured to convey the second head driver 62 in the length direction or a direction opposite to the length direction or adjust an angle formed between the second head driver 62 and the length direction.

The second driver conveyor 66 has the same structure as the first driver conveyor 48 described above, and thus a more detailed description thereof will be omitted. The second driver conveyor 66 may change the angle formed by the conveyance path of the laser nozzle 61 and the radiation path of the laser beam LB emitted from the laser nozzle 61 with respect to the length direction by the angle by which the second head driver 62 is rotated by the second driver conveyor 66.

FIG. 10 is a flowchart illustrating a film cutting method using a film cutting system according to an embodiment of the present disclosure.

Referring to FIG. 10, the film cutting method using the film cutting system 1 according to an embodiment of the present disclosure may include initially setting the film cutting system 1 according to a size of a film sheet P to be manufactured by laser cutting of a raw film F (S10), slitting the raw film F (S20), cutting the raw film F (S30), and collecting the film sheet P and scraps S (S40).

Hereinafter, the film cutting method using the film cutting system 1 according to the embodiment of the present disclosure will be described with reference to the drawings.

In step S10, as shown in FIG. 1, arrangement of the third conveyance unit 50 and the second laser unit 60 is adjusted in accordance with the size of the film sheet P to be manufactured by laser cutting of the raw film F.

For example, in step S10, the arrangement of the variable roller assembly 52 and the laser nozzle 61 may be adjusted by driving the roller conveyor 52c and the second driver conveyor 66 such that the distance between the first suction 80 and the second suction 100 and the distance between the laser nozzles 41 and 42 and the laser nozzle 61 become a unit length L of the film sheet P to be manufactured by laser cutting of the raw film F, respectively.

FIG. 11 is a plan view illustrating a method for slitting a raw film using the film cutting system shown in FIG. 1, FIG. 12A is a partially enlarged view of area A of FIG. 11, and FIG. 12B is a partially enlarged view of area B of FIG. 11.

In step S20, the first laser unit 40 is used to slitting the raw film F according to a unit width W of the film sheet P.

First, the first head driver 43 move the first laser nozzle 41 and the second laser nozzle 42 to dispose the same at predetermined positions such that such that the first laser nozzle 41 and the second laser nozzle 42 are spaced apart from each other by the unit width W of the film sheet P.

Thereafter, as shown in FIG. 2, the supply unit 10 intermittently supplies the raw film F only by a predetermined unit supply length, and the first to third conveyance units 50 convey the raw film F supplied by the supply unit 10 in the length direction. The first and second laser nozzles 41 and 42 radiate the laser beam LB onto the raw film F conveyed by the first to third conveyance units 50 in the length direction.

Here, the unit supply length of the raw film F is determined according to the length of the film sheet P to be divided from the raw film F. For example, as shown in FIG. 2, the unit supply length of the raw film F may be determined such that the raw film F supplied from the supply unit 10 at least covers the second adsorption pad 90 spaced apart from the suction port of the second suction 100 in the length direction among the second adsorption pads 90.

Referring to FIG. 11, when the laser beam LB emitted from each of the first and second laser nozzles 41 and 42 is radiated onto the raw film F being conveyed in the length direction through the above-described process, the raw film F may be laser cut in the length direction by the laser beam LB radiated from each of the first and second laser nozzles 41 and 42, and thus be slit according to the unit width W of the film sheet P.

As shown in FIGS. 12A and 12B, in slitting the raw film F, the raw film F may be slit such that a first cutting line C1 formed by slitting the raw film F by the laser beam LB radiated from the first laser nozzle 41 and a second cutting line C2 formed by slitting the raw film F by the laser beam LB radiated from the second laser nozzle 42 are respectively spaced apart from the front end of the raw film F by a predetermined marginal distance. That is, in slitting the raw film F, the raw film F must be laser cut such that the front ends of the first and second cutting lines C1 and C2 are spaced apart from the front end of the raw film F by a predetermined marginal distance, respectively. Then, the front end of the raw film F is not divided by the first and second cutting lines C1 and C2, but remains integrally connected. The reason for slitting the raw film F such that the front end of the raw film F remains connected will be described later.

FIG. 13 is a view illustrating a method for measuring an inclination angle of a raw film using an inclination measurement unit shown in FIG. 3, and FIG. 14 is a plan view illustrating a method for cutting a raw film using the film cutting system shown in FIG. 1.

FIG. 15A is a partially enlarged view of area A of FIG. 14, FIG. 15B is a partially enlarged view of area B of FIG. 14, FIG. 15C is a partially enlarged view of area C of FIG. 14, and FIG. 15D is a partially enlarged view of area D of FIG. 14.

Thereafter, in step S30, the first laser unit 40 and the second laser unit 60 cut the raw film F according to a predetermined length of the film sheet P.

The raw film F may have a curved structure curved in one direction or an eccentric structure that is skewed in one direction due to tensional imbalance occurring in the manufacturing process (stretching process). When the raw film F having a curved structure or an eccentric structure is supplied in the length direction, the raw film F remains inclined at a predetermined angle with respect to the length direction. Then, the first cutting line C1 and the second cutting line C2 formed for slitting in step S20 described above are also formed on the raw film F with the raw film F inclined by the inclination angle with respect to the length direction. Therefore, if the raw film F is cut in the width direction with the first cutting line C1 and the second cutting line C2 skewed by the inclination angle, an appropriate level of perpendicularity and dimensional accuracy of the film sheet P produced from the raw film F may not be secured.

In order to this issue, as illustrated in FIG. 3, the film cutting system 1 may further include an inclination measurement unit 110 configured to measure an inclination angle of the raw film F.

The structure of the inclination measurement unit 110 is not particularly limited. For example, as shown in FIG. 3, the inclination measurement unit 110 may include a first camera 112 and a second camera 114 configured to respectively photograph any one end of both ends of the raw film F, and a measurement unit 116 configured to measure the inclination angle of the raw film by analyzing the images generated from the first and second cameras 112 and 114.

The first camera 112 and the second camera 114 may be arranged at positions where the cameras are allowed to photograph any one end of both ends of the raw film F, and may be spaced apart from each other in the length direction of the raw film F. For example, as shown in FIG. 3, the first camera 112 may be arranged between the supply unit 10 and the first laser unit 40 to photograph one end of the raw film F, and the second camera 114 may be arranged between the first laser unit 40 and the second laser unit 60 to photograph one end of the raw film F. The inclination measurement unit 110 may further include a camera conveyor (not shown) capable of conveying the first camera 112 and the second camera 114 in the length direction or in the opposite direction to the length direction in a reciprocating manner. However, embodiments are not limited thereto.

Each of the first camera 112 and the second camera 114 photographs one end of the raw film F at positions spaced apart from each other in the length direction, and then transmits the captured images to the measurement unit 116.

The measurement unit 116 may measure the inclination angle of the raw film F by comparing the separation distance between the cameras 112 and 114 with a distance from a specific point of each of the cameras 112 and 114 to one end of the raw film F based on the captured images received from the cameras 112 and 114.

Referring to FIG. 13(a), based on the captured image generated by the first camera 112, the measurement unit 116 may measure X1 by which one end of the raw film F is spaced apart from the center point of the first camera 112 in the direction opposite to the width direction. Referring to FIG. 13(b), based on the captured image generated by the second camera 114, the measurement unit 116 may measure X2 by which the one end of the raw film F is spaced apart from the center point of the second camera 114 in the width direction. In addition, the separation distance Y between the first camera 112 and the second camera 114 may be obtained using a read scale arranged on the camera conveyance unit or other sensors.

The measurement unit 116 may calculate the inclination angles θ, θ1, and θ2 of the raw film F using values of X1, X2, and Y in Equations 1 and 2 below.

$$\theta = \theta 1 = \theta 2 = \tan^{-1}\left(\frac{X1 + X2}{Y}\right) \quad \text{[Equation 1]}$$

$$Y = Y1 + Y2 \quad \text{[Equation 2]}$$

θ, θ1, θ2: Inclination angle of the raw film F with respect to the length direction of the raw film F Y: Separation distance between the first camera and the second camera Y1: Distance by which the first camera is spaced apart from one end of the raw film F in the length direction of the raw film F Y2: Distance by which the second camera is spaced apart from the one end of the raw film F in the opposite direction to the length direction of the raw film F As the inclination measurement unit 110 capable of measuring the inclination angle of the raw film F is provided as described above, the inclination angle of the raw film F is measured using the inclination measurement unit 110, and then the head drivers 43 and 62 are rotated by the inclination angle measured by the inclination measurement unit 110 using the driver conveyors 48 in step S30. Thereby, the path along which the laser beam LB emitted from the laser nozzles 41, 42, 61 is radiated is rotated by the inclination angle, and thus the inclined position of the raw film F may be corrected.

Also, as shown in FIG. 14, the first head driver 43 moves one of the laser nozzles 41 and 42 and place the same at one end of the first head driver 43 so as not to face the raw film F. The is intended to prevent the laser nozzles 41 and 42 from interfering with each other in cutting the raw film F using the other one of the laser nozzles 41 and 42. Hereinafter, for simplicity, the cutting method for the raw film F will be described based on a case where the first head driver 43 dispose the second laser nozzle 42 at one end of the first head driver 43 so as not to face the raw film F.

When the head drivers 43 and 62 and the second laser nozzle 42 are disposed as described above, each of the head drivers 43 and 62 moves the first laser nozzle 41 or the laser nozzle 61 across the raw film F, and each of the laser nozzles 41 and 61 radiates the laser beam LB received from the laser oscillator onto the raw film F along a radiation path of the laser beam LB that is changed according to rotation of the head drivers 43 and 62.

Then, the raw film F is cut with the inclination angle corrected, and a film sheet P having a predetermined unit width W and a unit length L is separated and formed from the raw film F.

However, as shown in FIGS. 15A and 15B, in performing cutting, the raw film F should be laser cut such that a third cutting line C3 formed by cutting the raw film F by the laser beam LB emitted from the first laser nozzle 41 completely crosses the raw film F from one end of the raw film F to the opposite end, while intersecting the first cutting line C1 and the second cutting line C2. That is, in performing cutting, the raw film F should be laser cut such that the raw film F is divided by the third cutting line C3, and the rear end of the first cutting line C1 and the rear end of the second cutting line C2 protrude from the third cutting line C3 by a predetermined protrusion distance in the opposite direction to the length direction. The is intended to prevent the third cutting line C3 from failing to be completely connected to the first cutting line C1 and the second cutting line C2 due to tolerances and other causes and thus prevent the raw film F from being cut incorrectly or being uncut.

In addition, in performing cutting, as shown in FIGS. 15C and 15D, the raw film F should be laser cut such that both ends of a fourth cutting line C4 formed by cutting the raw film F by the laser beam LB emitted from the laser nozzle 61 are spaced apart from one end or the opposite end of the raw film F by a predetermined marginal distance, while the fourth cutting line C4 intersect the first cutting line C1 and the second cutting line C2. That is, in performing cutting, the raw film F must be cut such that the raw film F is not divided by the fourth cutting line C4. Then, as shown in FIG. 14, a scrap S formed at the front end of the raw film F and a scrap S formed at both side ends of the raw film F may be connected to each other.

In addition, in performing cutting, as shown in FIGS. 15C and 15D, the raw film F must be cut such that both ends of the fourth cutting line C4 protrude from the first cutting line C1 and the second cutting line C2 toward both side ends of the raw film F, respectively by a predetermined protrusion distance, and the front end of the first cutting line C1 and the front end of the second cutting line C2 protrude from the fourth cutting line C4 in the length direction by a predetermined protrusion distance.

The is intended to prevent the fourth cutting line C4 from failing to be completely connected to the first cutting line C1 and the second cutting line C2 due to tolerances and other causes and thus prevent the raw film F from being cut incorrectly or being uncut.

When the raw film F is cut as above, a film sheet P having a predetermined unit length L and a predetermined unit width W and a scrap S corresponding to the residue produced after forming the film sheet P may be separately formed from the raw film F, respectively, as shown in FIG. 14. The scrap S may be composed of an area corresponding to the front end of the raw film F and an area corresponding to both side ends of the raw film F extending from the front end of the raw film F in the opposite direction to the length direction, and may thus have a square bracket shape.

As the cutting of the raw film F is performed by rotating the head drivers 43 and 62 by the inclination angle of the raw film F so as to correct the inclination of the raw film F, the film sheet P may have high perpendicularity and dimensional accuracy.

FIGS. 16 and 17 are views illustrating a method for collecting a film sheet and scraps using the film cutting system shown in FIG. 1.

Next, in step S40, the film sheet P and the scrap S are individually collected.

Referring to FIG. 16, in order to individually collect the film sheet P and the scrap S, the film cutting system 1 may further include a fourth conveyance unit 120, an air gun 130, and a transporter 140.

The fourth conveyance unit 120 is a device configured to convey the film sheet P passed through the third conveyance unit 50.

The structure of the fourth conveyance unit 120 is not particularly limited. For example, as shown in FIG. 16, the fourth conveyance unit 120 may be configured as a fixed conveyor belt device including fourth fixed rollers 122 and a fourth conveyor belt 124. The fourth conveyance unit 120 may be arranged such that the rear end thereof is spaced apart from the front end of the third conveyance unit 50 by a predetermined distance in the length direction.

Each of the fourth fixed rollers 122 is fixedly arranged at a predetermined position. A part of the fourth fixed rollers 122 may be a drive roller, and the other part of the fourth fixed rollers 122 may be driven rollers.

The fourth conveyor belt 124 has a predetermined width and length such that the raw film F may be seated thereon, and is wound around the fourth fixed rollers 122 to form an endless track.

According to the fourth conveyance unit 120 configured as above, the film sheet P passed through the third conveyance unit 50 is seated on the fourth conveyor belt 124. The fourth conveyor belt 124 may convey the seated film sheet P in the length direction.

The fourth conveyance unit 120 may further include a fourth adsorption member 126 capable of adsorbing the raw film F through adsorption holes (not shown) formed in the fourth conveyor belt 124 such that the raw film F may be adsorbed to the fourth conveyor belt 124 while being conveyed.

As shown in FIG. 16, the air gun 130 is configured to shoot air at the scrap S passing through the gap between the third conveyance unit 50 and the fourth conveyance unit 120. The air gun 130 may separate the scrap S from the film sheet P by dropping scrap S through the gap between the third conveyance unit 50 and the fourth conveyance unit 120.

However, the scrap S has a square bracket shape as a portion corresponding to the front end of the raw film F and portions corresponding to both side ends of the raw film F are connected to each other. Thus, when the portion of the scrap S corresponding to the front end of the raw film F reaches the gap between the third conveyance unit 50 and the fourth conveyance unit 120, the air gun 130 may selectively shoot air at the portion of the scrap S corresponding to the front end of the raw film F in the thickness direction of the raw film F. Then, the portion of the scrap S corresponding to the front end of the raw film F may begin to fall through the gap between the third conveyance unit 50 and the fourth conveyance unit 120 due to the air. As the portion of the scrap S corresponding to both side ends of the raw film F is pulled by the weight of the portion of the scrap S corresponding to the front end of the raw film F, the entire scrap S may fall freely through the gap between the third conveyance unit 50 and the fourth conveyance unit 120.

In carrying out the cutting, cutting the raw film F such that the portion of the scrap S corresponding to the front end of the raw film F is separated from the portion of the scrap S corresponding to both side ends of the raw film F may make it difficult to collect the scrap as the number of formed scraps increases. The film cutting system 1 may reduce the number of formed scraps S by forming a scrap S having a square bracket shape, thereby efficiently collecting the scraps S.

In addition, the film cutting system 1 may further include a scrap loading box 150 arranged on the lower side of the gap between the third conveyance unit 50 and the fourth conveyance unit 120 such that the scrap S falling through the gap between the third conveyance unit 50 and the fourth conveyance unit 120 is loaded on the box.

As shown in FIGS. 16 and 17, the transporter 140 is configured to hold the film sheet P reaching the front end of the fourth conveyance unit 120 by vacuum adsorbing the front end of the film sheet P. In this regard, the film cutting system 1 may further include a product loading box 160 arranged to load the film sheet P released from the transporter 140. The product loading box 160 may be spaced apart from the front end of the fourth conveyance unit 120 by a predetermined distance in the length direction. When the product loading box 160 is arranged as described above, the transporter 140 may convey the film sheet P from the fourth conveyance unit 120 to the product loading box 160, and then release the film sheet P so as to be loaded on the product loading box 160.

Hereinafter, a method for individually collecting the film sheet P and the scrap S will be described.

First, the second conveyance unit 30 and the third conveyance unit 50 start to convey the film sheet P and the scrap S together in the length direction.

Next, when the front end of the scrap S reaches the installation position of the air gun 130, the air gun 130 shoot air at the front end of the scrap S. Then, as shown in FIG. 16, the scrap S may fall through the gap between the third conveyance unit 50 and the fourth conveyance unit 120 and be loaded into the scrap loading box 150.

Thereafter, the fourth conveyance unit 120 conveys the film sheet P passed through the third conveyance unit 50 to the front end of the fourth conveyance unit 120. Then, the transporter 140 may grip the film sheet P conveyed to the front end of the fourth conveyance unit 120, take the film sheet P to the product loading box 160, and load the film sheet P into the product loading box 160.

As shown in FIG. 17, when the film sheet P and the scrap S are collected, the supply unit 10 may resupply the raw film F by a predetermined unit supply length, the first The laser unit 40 may re-slit the raw film F supplied from the supply unit 10. In this way, the collecting process of the film sheet P and the slitting process of the raw film F may be performed simultaneously. Thereby, the total time required for the manufacturing process of the film sheet P may be reduced.

The present disclosure relates to a system and method for cutting a film, and provides the following effects.

First, according to the present disclosure, the slitting process and the cutting process for the raw film may be performed in combination, and accordingly the time required to manufacture a film sheet and the number of apparatuses required to manufacture the film sheet may be reduced.

Second, according to the present disclosure, inclination of the original may be corrected film by adjusting the cutting operation of the raw film according to the inclination pattern of the raw film.

Third, according to the present disclosure, products having various sizes may be manufactured through a variable conveyor device.

Fourth, according to the present disclosure, by forming scraps having a square bracket shape, the scraps may be collected smoothly.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

Accordingly, the present embodiments are not intended to limit the technical idea of the present disclosure, and the scope of the technical idea of the present disclosure is not limited by these embodiments. The scope of protection sought for by the present disclosure should be interpreted by the following claims, and all technical ideas within the scope equivalent thereto should be interpreted as being included in the scope of the present disclosure.

What is claimed is:

1. A film cutting system for dividing and forming a film sheet having a predetermined unit width and a unit length from a raw film by laser cutting of the raw film, the film cutting system comprising:
 a supply unit configured to intermittently supply the raw film of a predetermined unit supply length in a length direction of the raw film;
 a conveyance unit configured to convey the raw film supplied from the supply unit in the length direction;
 a first laser unit including a first laser nozzle and a second laser nozzle each configured to radiate a laser beam onto the raw film, the first laser unit further including a first head driver configured to convey the first laser nozzle and the second laser nozzle in a width direction of the raw film perpendicular to the length direction in a reciprocating manner; and
 a second laser unit including a laser nozzle disposed spaced apart from the first laser unit by the unit length in the length direction and configured to radiate a laser beam onto the raw film, the second laser unit further including a second head driver configured to convey the laser nozzle in the width direction in a reciprocating manner, and the second laser unit further yet including a second driver conveyor configured to convey the second head driver and the laser nozzle coupled to the second head driver in the length direction or in a direction opposite to the length direction in a reciprocating manner,
 wherein, when the raw film is supplied by the supply unit, the first head driver disposes the first laser nozzle and the second laser nozzle spaced apart from each other by the unit width, and each of the first laser nozzle and the second laser nozzle radiates the laser beam onto the raw film conveyed by the conveyance unit in the length direction to slit the raw film in the length direction, and
 wherein, when slitting of the raw film is completed:
 the supply unit stops supplying of the raw film;
 the first head driver conveys one of the first laser nozzle and the second laser nozzle in the width direction;
 the second head driver conveys the laser nozzle in the width direction; and
 the one of the first laser nozzle and the second laser nozzle, when conveyed by the first head driver in the width direction, radiates the laser beam onto the raw film and the laser nozzle, when conveyed by the second head driver in the width direction, radiates the laser beam onto the raw film to cut the raw film in the width direction to divide and form the film sheet from the raw film; and
 wherein the conveyance unit comprises:
 fixed rollers fixedly arranged at predetermined positions, respectively;
 a variable roller assembly including variable rollers arranged to form a processing region for laser cutting of the raw film and a roller conveyor configured to move the variable rollers in the length direction or in a direction opposite to the length direction in a reciprocating manner; and
 a conveyor belt wound around the fixed rollers and the variable rollers to form an endless track,
 wherein the raw film is seated in a predetermined seating section of the conveyor belt such that one area of the raw film covers at least a portion of the processing region.

2. The film cutting system of claim 1, further comprising:
 an inclination measurement unit configured to measure an inclination angle of the raw film skewed with respect to the length direction,
 wherein the first laser unit further includes a first driver conveyor to rotate the first head driver so as to adjust an angle of the first head driver formed with the length direction,
 wherein the second driver conveyor is configured to rotate the second head driver so as to adjust an angle of the second head driver formed with the length direction, and
 wherein, in cutting the raw film, the first driver conveyor rotates the first head driver to rotate, by the inclination angle, a path of radiation of the laser beam emitted from the one of the first laser nozzle and the second laser nozzle onto the raw film, and the second driver conveyor rotates the second head driver to rotate, by the inclination angle, a path of radiation of the laser beam emitted from the laser nozzle onto the raw film.

3. The film cutting system of claim 1, wherein, when the first laser nozzle slits the raw film, a first cutting line formed by laser cutting of the raw film in the length direction by the laser beam emitted from the first laser nozzle is spaced apart from a front end of the raw film by a predetermined marginal distance, and
 wherein, when the second laser nozzle slits the raw film, a second cutting line formed by laser cutting of the raw film in the length direction by the laser beam emitted from the second laser nozzle is spaced apart from the front end of the raw film by a predetermined marginal distance.

4. The film cutting system of claim 3, wherein, when one of the first laser nozzle and the second laser nozzle cuts the raw film, a third cutting line formed by laser cutting of the raw film in the width direction by the laser beam emitted from the one of the first laser nozzle and the second laser nozzle crosses the raw film in the width direction, and
 wherein, when the laser nozzle cuts the raw film, each of both ends of a fourth cutting line formed by laser cutting of the raw film in the width direction by the laser beam emitted from the laser nozzle is spaced apart from one side end or an opposite side end of the raw film by a predetermined marginal distance.

5. The film cutting system of claim 4, wherein, when the one of the first laser nozzle and the second laser nozzle cuts the raw film, the third cutting line intersects the first cutting line and the second cutting line, and a rear end of the first cutting line and a rear end of the second cutting line protrude from the third cutting line by a predetermined protrusion distance in a direction opposite to the length direction, and wherein, when the laser nozzle cuts the raw film, the fourth cutting line intersects the first and second cutting lines, and a front end of the first cutting line and a front end of the second cutting line protrude from the fourth cutting line by a predetermined protrusion distance in the length direction.

6. The film cutting system of claim 1, wherein the second driver conveyor conveys the laser nozzle in the length direction or in the direction opposite to the length direction to make the laser nozzle spaced apart from the first laser nozzle and the second laser nozzle by the unit length, wherein the roller conveyor conveys the variable rollers in the length direction or in the direction opposite to the length direction to change a position of the processing region to make the laser beam emitted from the laser nozzle radiated onto the one area of the raw film covering the processing region.

7. The film cutting system of claim 6, further comprising:
a suction arranged in the processing region to suck and remove foreign substances generated when the one area of the raw film covering the processing region is laser cut by the laser beam.

8. The film cutting system of claim 7, wherein the suction is arranged such that a position of a suction port of the suction coincides with a processing point of the raw film onto which the laser beam emitted from the laser nozzle is radiated.

9. The film cutting system of claim 1, wherein the variable roller assembly further comprises a rotation support plate rotatably coupled with each of the variable rollers, wherein the roller conveyor conveys the rotation support plate in the length direction or in the opposite direction to shift the processing region along the variable rollers.

10. The film cutting system of claim 1, wherein the variable rollers are arranged at predetermined intervals such that the processing region is partitioned by a curve section of the conveyor belt passing through the variable rollers while being bent according to arrangement of the variable rollers.

11. The film cutting system of claim 1, further comprising:
an adsorption pad fixedly arranged in the processing region to vacuum-adsorb the one area of the raw film covering the processing region.

* * * * *